March 22, 1960   J. J. COGLEY ET AL   2,930,009
PRESSURE TRANSDUCER
Filed June 13, 1955
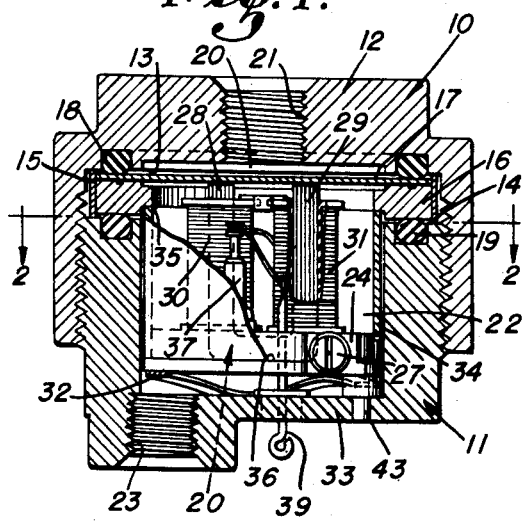
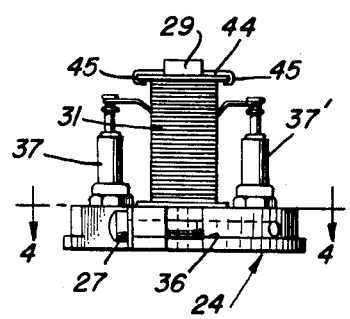
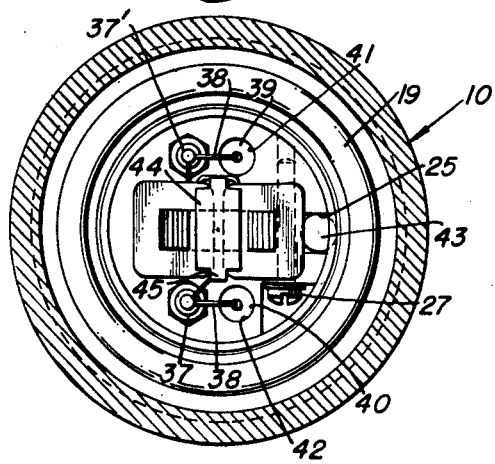
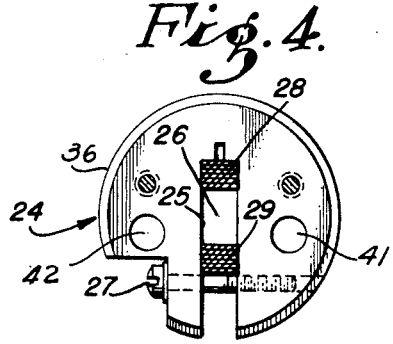
JAMES J. COGLEY,
FRANK A. LITTLE,
MARVIN J. STARKEY,
INVENTORS.
BY
Attorney

2,930,009
PRESSURE TRANSDUCER

James J. Cogley and Frank A. Little, Los Angeles, and Marvin J. Starkey, Manhattan Beach, Calif., assignors to Datran Engineering Corp., Manhattan Beach, Calif., a corporation of California Application June 13, 1955, Serial No. 515,082

3 Claims. (Cl. 336—30)

The present invention relates generally to a transducer, and is more particularly concerned with a transducer which is adapted to change applied liquid or gas pressures into a proportional electric analog.

Heretofore, the use of devices of the herein described character as conventionally constructed has been materially limited because of instability due to adverse effects of temperature changes of the various parts of the instrument, as well as the changes in ambient temperature.

With the foregoing in mind, the present invention contemplates as an object an improved device as stated above which will automatically compensate for temperature effects of various parts, and changes in ambient temperature, and in which the effects of temperature changes will be reduced to a minimum.

A further object is to provide a transducer having a variable inductance output which is proportional to the difference between two applied fluid pressures.

Still another object is to provide a pressure transducer which is susceptible of use in bridge circuits, and which may readily be connected into an oscillator circuit so that the variable-inductance becomes the frequency determining element of the oscillator, whereby the output frequency of the oscillator will then be proportional to the differential pressures applied to the transducer.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a vertical sectional view through a device embodying the features of the present invention, certain parts being disclosed in full lines;

Fig. 2 is a transverse sectional view, taken substantially on line 2—2 of Fig. 1;

Fig. 3 is a side elevational view of the coil assembly and mounting as it appears, when removed from the device; and Fig. 4 is a transverse sectional view of the coil mounting, taken substantially on line 4—4 of Fig. 3.

Referring now to the drawings, the device of the present invention is disclosed as being contained within a housing structure composed of two body sections 10 and 11 of generally cup-shaped configuration, these sections being interconnected at their open ends by screw threads or other suitable conventional means to provide an internal cavity. As shown in Fig. 1, the section 10 has an end wall 12 which is provided on its inner surface with an annular shoulder 13 in confronting relation to the rim edge face 14 of body section 11. Axial movement of the body sections is terminated during assembly by engagement of the annular shoulder and the rim edge face with the opposite ends respectively of a spacer ring 15 of suitable material, in this case being constructed of aluminum.

By utilizing the spacing ring 15, a mounting space is provided between the annular shoulder and rim edge face within which there is a resiliently supported diaphragm assembly. The diaphragm assembly comprises a mounting ring 16 which has a disk diaphragm 17 secured thereto in its peripheral margin by means of silver solder or other means. The thickness of the mounting ring 16 and diaphragm secured thereto is slightly less than the length of the spacer ring 15, and the diaphragm assembly is resiliently supported by means of O-rings 18 and 19 mounted respectively in retaining grooves in the annular shoulder 13 and the rim edge face 14 of the body sections. The diaphragm assembly is thus floatingly supported so as to be free of any stresses or changes in the body section.

The O-rings further seal the diaphragm with respect to the spaces on the opposite side thereof. One side of the diaphragm 17 is in communication with a chamber 20 having a conduit connection 21 by which the chamber may be connected with a source of fluid pressure.

The opposite side of the diaphragm 17 is in communication with a larger chamber 22 which is provided with a conduit connection 23 by means of which this chamber may be connected with a different source of fluid pressure, so that the diaphragm will be subject to an unbalancing of the pressures acting on its opposite sides. The large chamber 22 serves to house electromagnetic means which are instrumental in converting the diaphragm movements into a proportional electric analog in the form of a variable inductance output. The electromagnetic means for accomplishing this purpose will now be described.

Within the chamber 22, there is positioned a plate member 24, as shown in Fig. 4. This plate member is of generally round configuration and is positioned for axial movement within the chamber. As shown, the plate is provided with a radially extending slot 25 which is adapted to receive the bridging portion of a U-shaped core structure 26 which is clamped by means of a clamping screw 27 into a position with its legs 28 and 29 projecting upwardly from the plate member, as shown in Fig. 1.

The legs of the core structure terminate in end poles which are adjacently spaced with respect to the diaphragm 17. Coil windings 30 and 31 are positioned respectively on the legs 28 and 29 so that these windings will be linked by the magnetic flux path through the core structure.

The plate member 24 with the core and coil structures mounted thereon is resiliently biased in a direction towards the diaphragm 17 by an annular compression leaf spring 32 positioned between the plate and adjacent end wall 33 of the body section 11. This movement of the coil assembly is limited by means of a spacer sleeve 34 of cylindrical construction, this sleeve being positioned concentrically of the coil assembly with one end abutting a flange 35 formed on the mounting ring 16, and its other end abutting a flange 36 formed at the periphery of the plate member 24. The spacer sleeve 34 is constructed of a suitable material such as an aluminum alloy which will have high expansion characteristics with increases of temperature.

The plate member 24 also carries a pair of standoff insulated terminals 37 and 37' which are connected with the coils, and through flexible conductors 38 with connection terminals 39 and 40 which are sealed in the end wall 33 and have their innermost ends extending into openings 41 and 42 formed in the plate member 24, as shown in Figs. 2 and 3.

The plate member 24 and coil assembly thereon is retained against circumferential shifting in the chamber 22 by means of an upstanding index pin 43, this pin having one end secured in the end wall 33 and its other end extending into the slot 25, as shown in Fig. 2.

In addition to the temperature compensating action provided by the expansion and contraction of the spacer sleeve 34, additional compensation is also provided through the utilization of a flux compensator. For such purpose, there is provided a plate 44 having projecting end lugs 45—45 which are adapted to be deflected around the coil spool ends to anchor the plate in a position between the polar ends of the core. The plate 44 is constructed of a suitable material such as nickel-steel which has the characteristic of decreasing its permeability with an increase in temperature. The plate 44 thus acts as a magnetic shunt which is variable under temperature changes.

While the diaphragm 17 has been disclosed as forming a part of the magnetic path for the coils 30 and 31, it will be appreciated that a nonmetallic diaphragm might be utilized, this diaphragm being fitted with a small pole piece which upon vibrations or flexing of the diaphragm will affect a flux path between the poles. Temperature variations with the construction previously described are compensated for by the expansion and contraction of the spacer sleeve 34, this action moving the diaphragm and core pole ends relatively so as to vary the reluctance of the magnetic path and thus compensate for temperature variations.

In addition temperature compensation is also effected by the action of the plate 44 and its shunting effect which is varied in response to temperature changes. With these expedients, temperature effect can be reduced in the order of two to ten times below that of a device which is not compensated for temperature variations, thus enabling more sensitive and reliable interpretation of pressure changes into a proportional electric analog, and the utilization of the variable inductance output of the device in bridge circuits and frequency control for oscillator circuits, as previously mentioned.

Various modifications may suggest themselves to those skilled in the art without departing from the spirit of our invention, and, hence, we do not wish to be restricted to the specific form shown or uses mentioned, except to the extent indicated in the appended claims.

We claim:

1. A pressure transducer, comprising: a hollow body formed by connected sections having internal confronting annular shoulders; diaphragm means positioned between said shoulders; a sealing member between each of said shoulders and the adjacent peripheral margin of said means; means for connecting fluid pressures to act on opposite sides of said diaphragm; a support; a magnetizable core structure carried by said support, said structure having pole ends positioned adjacent said diaphragm means; a coil operatively associated with said core structure; a spacer member extending between said diaphragm means and said support, said spacer member being extensible and retractable in response to temperature change; and spring means resiliently retaining the spacer, support and diaphragm means in assembled engagement, whereby the position of said pole ends is varied with respect to said diaphragm means in response to temperature changes.

2. A pressure transducer, comprising: a hollow body defining an internal cavity; a diaphragm separating said cavity into separate chambers; electromagnetic means positioned in one of said chambers including a core structure having pole ends positioned adjacent said diaphragm and an operatively associated energizing coil; means for floatingly supporting said diaphragm and electromagnetic means as a unit with respect to said body; and connections respectively with said chambers for fluid pressures for acting on the opposite sides of said diaphragm.

3. A pressure transducer, comprising: a hollow body defining an internal cavity; a diaphragm separating said cavity into separate chambers; electromagnetic means positioned in one of said chambers including a core structure having pole ends positioned adjacent said diaphragm and an operatively associated energizing coil; means for floatingly supporting said diaphragm and electromagnetic means as a unit with respect to said body; means for moving said electromagnetic means as a unit to vary the spacing of said pole ends with respect to said diaphragm in response to temperature changes; and a connection to at least one of said chambers for fluid pressure for acting on one side of said diaphragm.

References Cited in the file of this patent

UNITED STATES PATENTS

| | | |
|---|---|---|
| 2,641,742 | Wolfe | June 9, 1953 |
| 2,707,001 | Hathaway | Apr. 26, 1955 |
| 2,715,717 | Keithley | Aug. 16, 1955 |
| 2,717,364 | Hodgin | Sept. 6, 1955 |
| 2,748,357 | Garcia | May 29, 1956 |
| 2,758,288 | Shannon | Aug. 7, 1956 |